United States Patent [19]
Ciaurriz Andueza

[11] Patent Number: 5,850,859
[45] Date of Patent: Dec. 22, 1998

[54] COFFEE-MILL DISPENSING DEVICE

[75] Inventor: Juan Ignacio Ciaurriz Andueza, Huarte-Plamplona, Spain

[73] Assignee: Azkoyen Hosteleria, S.A., Huarte-Pamplona, Spain

[21] Appl. No.: 890,657

[22] Filed: Jul. 9, 1997

[30] Foreign Application Priority Data

Jul. 10, 1996 [ES] Spain .................................... 9601545

[51] Int. Cl.⁶ ...................................................... B65B 3/04
[52] U.S. Cl. .......................... 141/361; 141/249; 141/358; 141/362; 99/211; 99/305; 99/316
[58] Field of Search ............................ 99/291, 305, 316; 141/248, 360, 361, 362, DIG. 1, 357, 358; 193/31 A; 406/1, 2, 3, 183

[56] References Cited

U.S. PATENT DOCUMENTS

| | | | |
|---|---|---|---|
| 1,605,490 | 11/1926 | Watson | 406/3 |
| 2,845,964 | 5/1958 | Harland | 141/104 |
| 3,016,930 | 1/1962 | Dziedziula et al. | 141/361 |
| 5,094,153 | 3/1992 | Helbling | 99/280 |
| 5,158,793 | 10/1992 | Helbling | 426/231 |
| 5,265,518 | 11/1993 | Reese et al. | 99/280 |
| 5,349,993 | 9/1994 | Casey | 141/94 |
| 5,477,775 | 12/1995 | Delhom et al. | 99/299 |

Primary Examiner—J. Casimer Jacyna
Assistant Examiner—Kerry S. Culpepper
Attorney, Agent, or Firm—Helfgott & Karas, P.C.

[57] ABSTRACT

The device includes a pair of passages (4—4') meeting at a top neck (5) communicating with and coupled laterally to the outlet of the mill (1). The junction between the passages (4—4') has a hinged trapdoor (7) which in a stable position seals one of the passages whilst holding the other one open. The passages (4—4') are closed at the bottom by rotatory trapdoors (14—14') which may be driven by activating two electric magnets that are activated by respective microswitches (18—18') lying beneath the passages (4—4'), and hence the arrangement of the cup (19) to receive a measure of coffee brings about an activation of the electric magnets and thus turning of the respective trapdoor (14—14'), an upright arm (22—22') being at the same time driven which acts upon a balance lever (10) solidly connected to an extension (9) of the mounting pin (8) of the trapdoor (7), causing the latter to swing towards the closed position of the passage (4—4') opposite the passage which supplies the measure of coffee onto the cup (19).

3 Claims, 3 Drawing Sheets

COFFEE-MILL DISPENSING DEVICE

OBJECT OF THE INVENTION

The invention relates to a device designed to be coupled to the outlet of a coffee-mill and allow one or two measures of coffee to be automatically dispensed onto the respective cup or carrier of a coffee-maker. It is further designed for the mill to start operating forthwith upon the respective measure of coffee being removed, in order to grind a quantity equal to the measure taken.

The device is essentially applicable to coffee-mills forming part of or associated to coffee-makers in public houses such as bars, cafés and other establishments catering for the public, and in general wherever coffee is offered to the public.

BACKGROUND OF THE INVENTION

European patent no. 90810944.0 to ARMELLIN, S. A. describes a ground coffee distribution device provided to be fitted in a coffee-mill, i.e. to be coupled to the outlet of a coffee-mill, which device consists of two chambers or reservoirs, each designed to contain at least a measure of ground coffee, these chambers or reservoirs being further fitted with respective bottom hinged trapdoors which, when closed, hold the measure of coffee inside, whereas when swung allow the measure of coffee to drop towards a hopper. Each chamber or reservoir has a side opening to receive ground coffee so that the coffee is always supplied to the empty chamber.

The bottom trapdoors of the ground coffee chambers or reservoirs are closed by the pulling action of respective springs which tend to hold the trapdoors closed, whereas they are opened by means of hinged parts articulated to each other and which may be driven by pushing each of them.

With the device of said European patent, when a single coffee is to be made, one of the trapdoors is opened to obtain the measure which allows the respective coffee to be made, whereas when two coffees are to be made, both trapdoors are simultaneously opened and logically both of the measures provided drop from each chamber or reservoir containing the ground coffee.

DESCRIPTION OF THE INVENTION

The device subject hereof is designed to provide the measure of coffee required by the operator instantaneously and to grind, with the respective mill, a measure of coffee equal to that which has just been dispensed.

More specifically, the device of the invention consists of a hopper fitted with an upper passage having a neck coupled directly to the outlet mouth of a coffee-mill, two parallel, upright dispensing passages fitted with bottom, rotatory closing trapdoors being established beneath the said upper passage, which trapdoors are driven by respective electric magnets which pull said trapdoors by means of two horizontal shafts arranged between the same and the electric magnets, which shafts are solidly connected to respective upright arms acting on a balance lever having two wheels at its ends, which balance lever forms part of the hinge pin of a hinged trapdoor that can take up two positions, in each of which it seals one of the dispensing passages leaving the other one open, and vice versa.

When the cup receiving the coffee is arranged beneath one of the trapdoors, said cup drives a microswitch that activates the respective electric magnet to open the respective trapdoor of the dispensing passage at issue, the ground coffee contained in said passage falling onto the pan as such. With this construction, the ground coffee always drops through the common upper passage but depending on the position of the trapdoor, defined by the position of the cup, the coffee drops into either of the dispensing passages.

The horizontal movement of the electric magnet shaft in turn brings about the movement of an upright arm solidly connected thereto, thereby for an extension of this upright arm to impinge upon either of the wheels with which the balance lever is provided, causing the pin of the hinged trapdoor to turn in order for the trapdoor to take up a position closing a passage, which logically causes the adjacent trapdoor to be opened, allowing the measure of coffee supplied or ground by the actual mill to drop through such passage.

Consequently, the hinged trapdoor, which is driven each time a measure of coffee is required and obtained, will seal with its respective position one of the dispensing passages and allow ground coffee to be freely received in the opposite passage.

The bottom, rotatory closing trapdoors provided beneath the dispensing passages are biased towards a permanently closed position by a spring.

The device is designed to house equal or different measures of ground coffee in each passage and, in particular, to allow one or two measures of coffee to be automatically dispensed onto the respective cup.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following.

PREFERRED EMBODIMENT OF THE INVENTION

Figure 1:
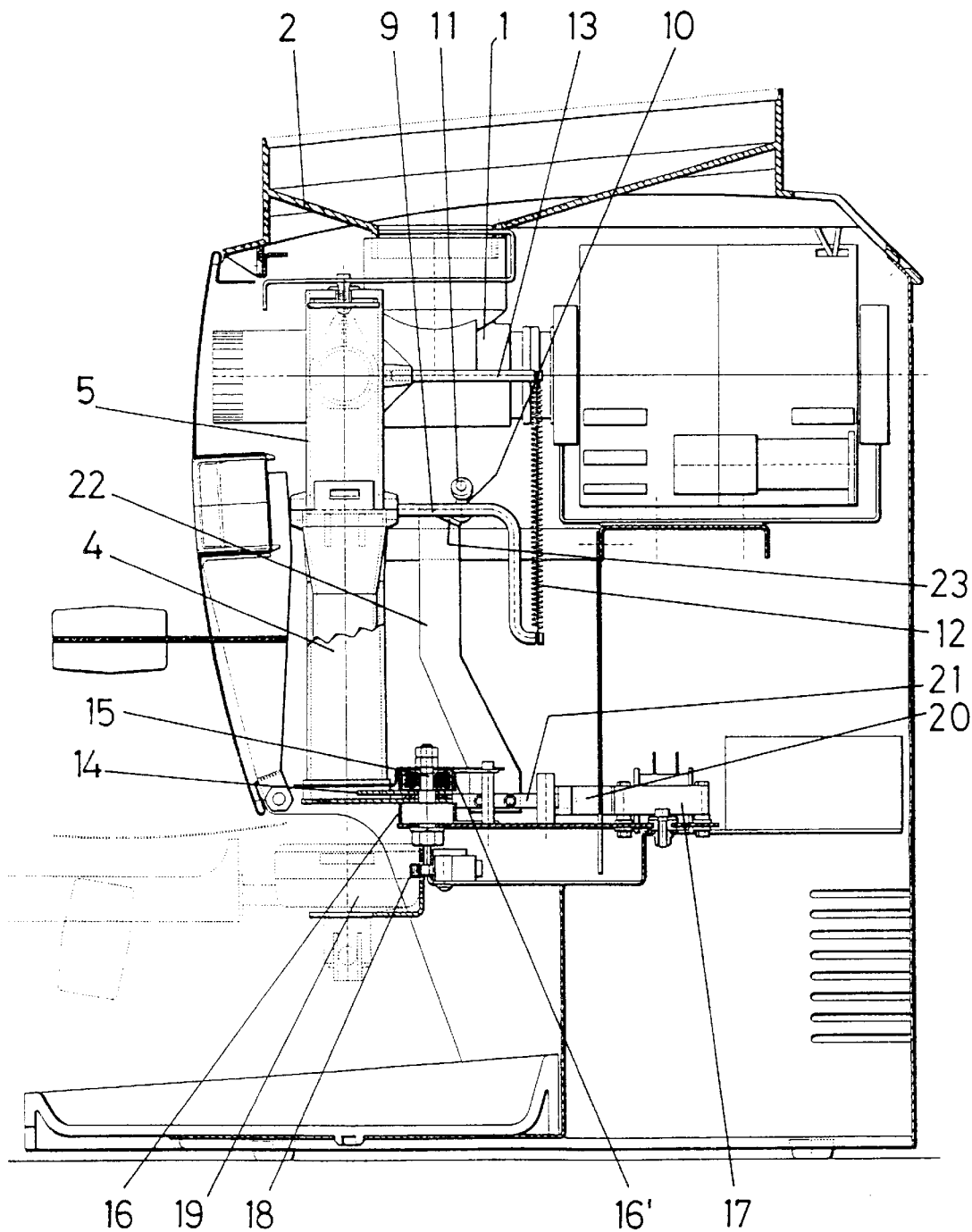
FIG. 1. Is a side elevation view of the dispensing device applied to a coffee-mill, made fully in accordance with the object of the invention.
Figure 2:
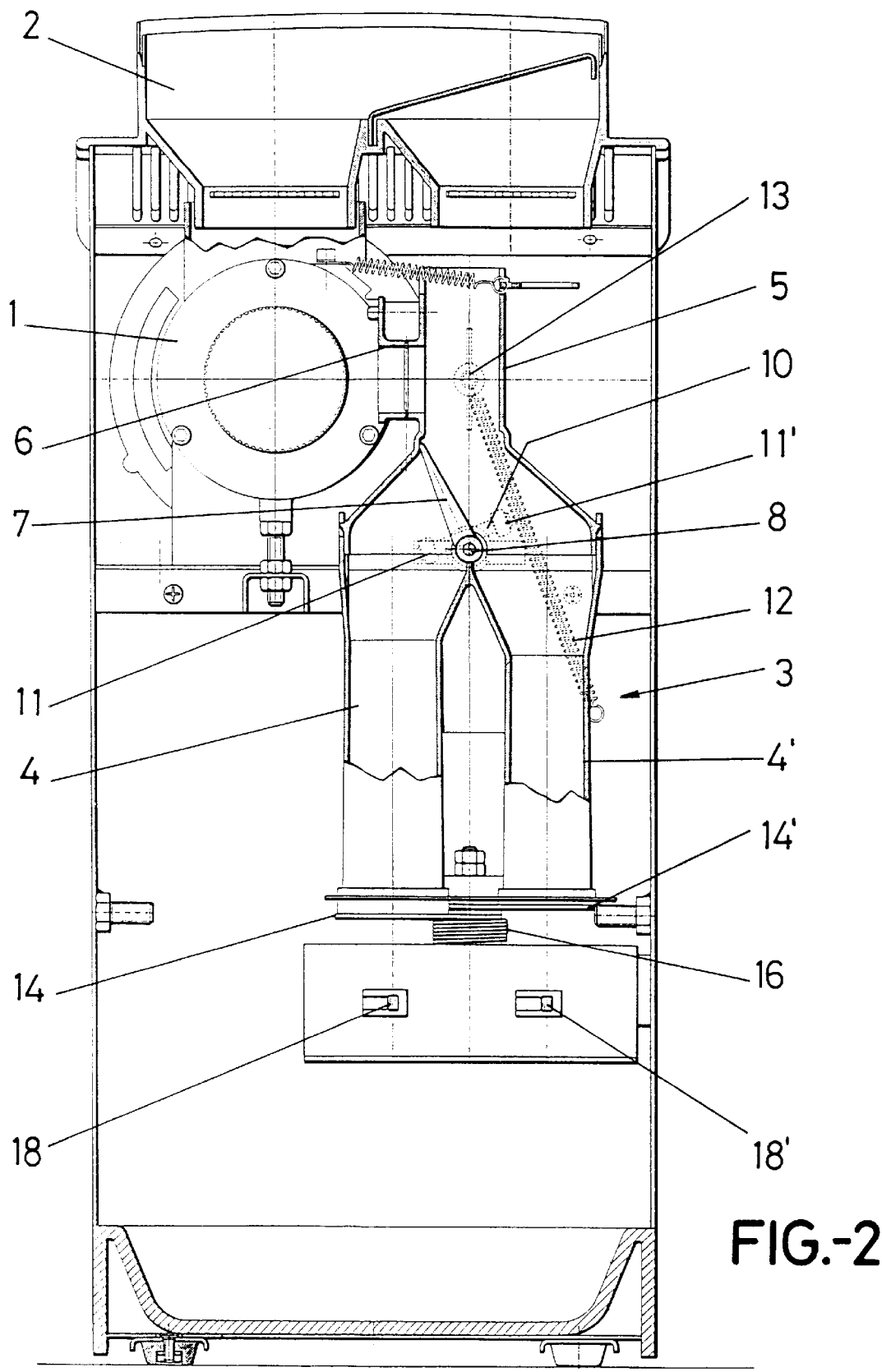
FIG. 2. Is a front view of the same device shown in the previous figure.
Figure 3:
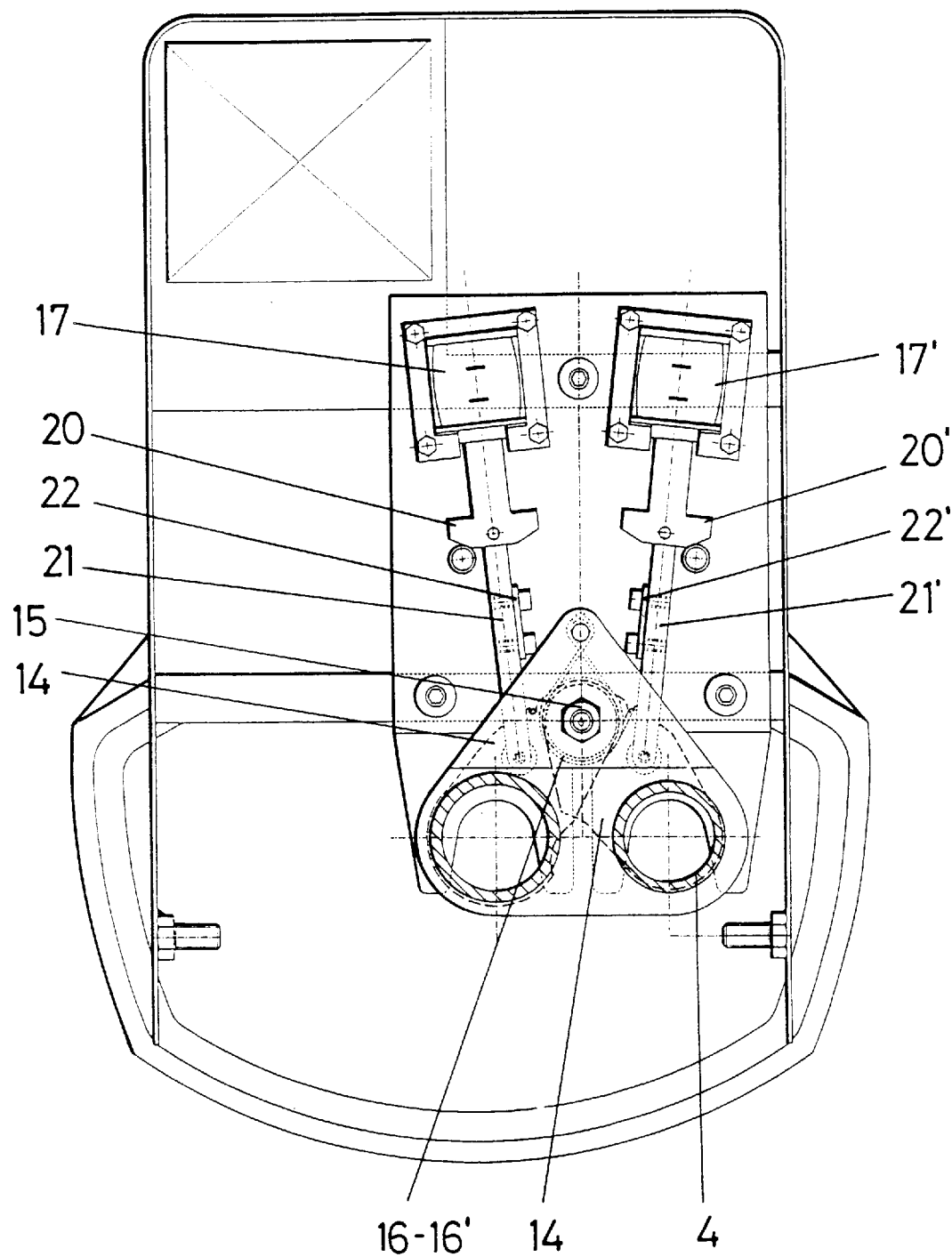
FIG. 3. Is a plan view of the electric magnet mechanism and arms associated thereto to open the bottom rotatory trapdoors that close the ground coffee dispensing passages.

With reference to the aforesaid figures, the device of the invention is designed to be applied to a coffee-mill (1), provided with a supply hopper (2), whereas its side has a respective outlet couplable to the actual device, the latter consisting of a dispensing hopper (3) provided with two parallel, upright passages (4—4') defining an inverted "Y" configuration therein, with a common upper portion or passage (5) having a lateral neck (6) through which it is directly coupled to and, communicated with the outlet of the mill (1).

The junction between the passages (4—4'), i.e. where the common passage (5) is branched, has a hinged trapdoor (7) designed in such a way that depending on its position one of the passages (4—4') may be sealed and the other opened, preventing coffee from entering into the first passage and enabling access of coffee into the second passage, and vice versa. This trapdoor (7) is mounted on a hinge pin (8) which has an extension (9) through which it is solidly connected to a balance lever (10) provided with wheels (11—11') at each of its ends, which extension (9) is elbowed at its free end, where the end of a spring (12) is attached whose other end is in turn anchored in a fixed arm or shaft (13) provided in the general structure of the device.

The respective outlets will be established at the bottom end of the passages (4—4') and will be opened and closed by means of respective trapdoors (14—14') that are hinged about a common, upright pin (15), said trapdoors (14—14') being biased towards a permanently closed position by a spring (16).

The trapdoors (14 or 14') are driven to be opened by means of respective electric magnets (17—17') which are activated by means of respective microswitches (181'18') driven when the respective cup (19) is arranged beneath the outlet of the respective passage (4—4'), and pressed against the said microswitch (18—18'). In other words, when the cup (19) receiving the ground coffee is arranged beneath either of the passages (4—4') and the respective microswitch (18—18') is pressed, the latter activates the respective electric magnet (17—17'), drawing the arm (20—20') that in turn pulls the stays (21—21') linked to such arms (20—20'), the stays (21—21') being solidly connected precisely to the trapdoors (14—14).

Upright arms (22—22') are in turn each fixed on the stays (21—21') with their top end (23) bevelled to impinge on either of the wheels (11—11') of the balance lever (10), in accordance with the position of the latter.

The said device may be used to automatically select the adequate position of the hinged trapdoor (7) according to the following operating sequence:

When the cup (19) is arranged beneath one of the passages (4—4'), the respective microswitch (18—18') will be activated and consequently so will the electric magnet (17—17'), which will draw the arm (20—20') and thus the stay (21—21'), causing the respective trapdoor (14—14') to turn and thus open the outlet of the passage (4—4'), allowing the relevant measure of ground coffee contained in such passage (4—4') to be dropped onto the cup (19).

When the said cup (19) is withdrawn, with the measure of coffee contained in the passage (4—4'), the respective electric magnet (17—17') will be deactivated, for the microswitch (18—18') will no longer be pressed, thereby for the arm (20—20') with its stay (21—21') to cease being pulled and hence the trapdoor (14—14') will retrieve its closed position by action of the coil (16—16').

Going back to the operation to open the trapdoor (14—14'), it is noteworthy that the respective arm (22—22') solidly connected to the stay (21—21'), upon the latter being moved, brings about an upright and upward movement of the arm (22), and its bevelled edge (23) thus acts on the respective wheel (11—11') of the balance lever (10), causing the pin (8) to turn and hence causing the trapdoor (7) to turn, to logically take up a position closing the passage (4—4') opposite that beneath which the cup (19) receiving the ground coffee is positioned.

In the event that a measure is desired from the same passage from which coffee was last required, this will not be possible because the wheel (11) of the balance lever (10) will previously have been pushed by the bevelled end (23) of the arm (22), and the trapdoor (7) may not therefore be swung to the other position.

If, however, a measure of coffee is required from the other passage, the movement of said parts will cause the respective arm (22—22') to push on the opposite wheel (11—11'), causing the same to swing to the other side and, consequently, causing the balance lever (10) to swing and change the position of the trapdoor (7), sealing the passage which was previously opened, and opening that which was sealed.

Consequently, the wheels (11—11') of the balance lever (10) can take up two extreme positions, i.e. pushed to either side, corresponding to the two positions of the trapdoor (7), sealing either passage, the thrust of the arm (22—22') together with the force of the spring (12) causing the trapdoor (7) to switch from one position to the other.

In other words, in accordance with the arrangement of the cup (19) beneath either passage (4—4'), once the measure of coffee has been duly removed, the respective emptied passage will be filled, which filling will take place with a quantity of coffee equal to that previously removed, which means that each passage (4—4') must be provided at the appropriate level, with a filling level photocell or other element causing the mill to stop when the quantity of ground coffee corresponding to the measure of the previously emptied passage has been attained, which control of the quantity to be measured out can be made by time or a combination of time and photocell, bearing in mind at all times that, upon the withdrawal of the cup (19) and with the respective measure of coffee, the mill is automatically started with suitable means to grind a quantity of coffee equal to the previously removed measure, for such operations shall have previously been programmed.

Now, obviously, the trapdoor (7) may be driven by means of a motor or other conventional system.

I claim:

1. A coffee-mill dispensing device, devised to be directly coupled to the outlet of a coffee-mill (1) and allow one or two measures of coffee to be directly dispensed onto the respective cup (19) of a coffee-maker, two passages (4—4') being established in the actual device, meeting at the top in a neck (5) communicating with the actual outlet of the mill, these passages (4—4') receiving the measures of ground coffee being fitted at the bottom with trapdoors (14—14'), characterised in that the junction between the passages (4—4') has a hinged trapdoor (7) which may be driven to take up two positions at which one of the passages is sealed and coffee may be freely received in the other passage; the bottom of said passages (4—4') being provided to have independent hinged trapdoors (14—14') biased towards a closed position by means of a spring (16—16'), and solidly connected to respective stays (21—21') which are linked to arms (20—20') that may be drawn by means of the core of respective electric magnets (17—17'), which may be activated by microswitches (18—18') that are activated by the respective cup (19) designed to receive the measure of coffee contained in the respective passage (4—4'); being particular in that the stays (21—21') each have an upright arm (22—22') fixed thereon which may be moved vertically when the stays (21—21') are duly pulled upon the electric magnets (17—17') being activated, the top end of such upright arms (22—22') impinging upon either of the wheels (11—11') provided in a balance lever (10) solidly connected to an extension (9) of the pin (8) on which the hinged trapdoor (7) is mounted, thereby for the stable arrangement of the balance lever (10) in either position to bring about the arrangement in either position of the trapdoor (7) and hence the sealing of either passage (4—4') and for coffee to be freely received in the opposite passage.

2. A coffee-mill dispensing device, as in claim 1, characterised in that the upright arms (22—22') have their top end (23) bevelled to impinge upon either of the wheels (11—11') of the balance lever (10), the extension (9) of the mounting pin (8) of the hinged trapdoor (8) being elbowed and linked through its free end to a spring or coil (12) whose other end is anchored in a fixed arm or shaft (13), which spring (12) tends to hold the respective position of the balance lever (10)

previously attained by the pushing action of the bevelled end (23) of the actual arm (22—22') stable.

3. A coffee-mill dispensing device, as in claim 1, characterised in that bottom rotatory trapdoors (14—14') closing the outlets of the dispensing passages (4—4') are mounted on a common pin (14) about which they turn, and are biased towards the closed position by coils (16—16').

* * * * *